United States Patent Office 3,733,299
Patented May 15, 1973

3,733,299
PROCESS FOR THE PREPARATION OF POLYPHENYLENE ETHERS WITH ACTIVATED COPPER-AMINE CATALYSTS
Glenn D. Cooper, Delmar, and James G. Bennett, Menands, N.Y., assignors to General Electric Company
No Drawing. Filed June 10, 1971, Ser. No. 151,933
Int. Cl. C08g 23/18
U.S. Cl. 260—47 ET
15 Claims

ABSTRACT OF THE DISCLOSURE

There is disclosed an improved process for the preparation of high molecular weight polyphenylene ethers by oxidatively coupling a di-ortho-substituted phenolic precursor in a reaction system containing oxygen and a complex catalyst formed from a copper salt and either a primary, secondary or tertiary amine and an alkali metal bromide or alkaline earth metal bromide as an activator for the catalyst. Use of the activator results in the formation of higher molecular weight polymer in a given reaction time or polymer of comparable molecular weight in substantially decreased reaction time.

This invention relates to the formation of synthetic polymers from phenolic precursors, and more particularly, to the formation of polyphenylene ethers by the oxidative coupling of a 2,6-disubstituted phenol in a reaction system containing oxygen and a complex catalyst formed from a copper salt and either a primary, secondary or tertiary amine and an alkali metal bromide or alkaline earth metal bromide activator for the catalyst.

BACKGROUND OF THE INVENTION

The polyphenylene ethers and processes for their formation are known in the art and described in numerous publications including Hay, U.S. 3,303,874 and 3,306,875, and others.

The most useful processes involve oxidative self-condensation of a monovalent phenolic precursor using oxygen and a catalyst comprising an amine-copper salt complex. Phenols which are polymerized by the process are monovalent phenols having substitution in at least the two ortho positions and hydrogen or halogen in the para position. By way of illustration, they correspond to Formula I:

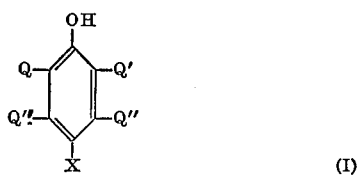

(I)

where X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' is as defined for Q and in addition, halogen, and Q'' are each as defined for Q' and, in addition hydrogen, with the proviso that Q, Q' and Q'' are all free of a tertiary alpha-carbon atom. Polymers formed from the above-noted phenols will therefore correspond to Formula II:

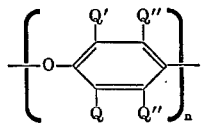

where the oxygen ether atom of one repeating unit is connected to the phenylene nucleus of the next repeating unit; Q, Q' and Q'' are as above defined; and $n$ is a whole integer equal to at least 50.

According to the Hay patents, the formation of the polyphenylene ethers involves the self-condensation of the phenolic compound in the presence of oxygen and a catalyst system comprising an amine-basic cupric salt complex. For details regarding the preparation of complex catalysts for the oxidative coupling of phenolic compounds to polyphenylene ethers reference is made to the above-mentioned Hay patents.

Even though the Hay patents teach that many copper salts may be used, it is also known that there are variations in the activity as between copper salts. Although cupric salts are generally considered to be inactive it has been discovered, for example, that certain salts, such as anhydrous cupric bromide, have an unexpectedly high degree of activity. Others, such as cupric sulfate, cupric acetate and cupric fluoride, have only weak activity. The nature of the amine used also effects the catalyst activity. With most tertiary amines, cuprous bromide or cuprous chloride are more active than cupric bromide.

It has now been discovered that the catalytic activity of complexes of copper salts and amines for the oxidative coupling of phenols is greatly increased by the addition of certain metallic bromides, e.g., alkali metal bromides, such as sodium, potassium, lithium and cesium bromide or alkaline earth metal bromides, such as magnesium bromide, to the catalyst mixture. For some as yet unexplained reason, cupric sulfate, cupric acetate, and cupric fluoride, which have a very low degree of activity at the preferred reactant ratios become very active when a bromide is included in the complex catalyst. Such activated catalysts using these copper salts produce for the first time polymers with degrees of polymerization high enough to be suitable for molding in less than a two hour reaction period. Moreover, even relatively more active copper salts, such as cupric chloride, are significantly increased in activity when a bromide is added, and the activity is approximately equal to that of anhydrous cupric bromide, which appears to be one of the most active forms of the copper salts.

Surprisingly, the above advantages cannot be explained by postulating a reaction between the copper salt and the bromide to give a copper bromide. Experimentally, cupric acetate in methanol fails to react with sodium bromide to form cupric bromide. In addition, it is not possible to demonstrate a reaction between cuprous chloride and sodium bromide to produce cuprous bromide, under the conditions of the present process.

The process of this invention is therefore primarily an improvement over other processes in the prior art in that—because an activator is present in the catalyst—the molecular weight of the polyphenylene ether formed is higher than otherwise available in a given reaction time, or alternatively, the reaction time is shorter for recovery of polymer of comparable molecular weight.

As between cuprous and cupric salts, cuprous salts with tertiary amines and bromide salts form more active catalysts than cupric salts under the same conditions. On the other hand, cupric salts with primary and secondary amines and bromide salts form more active catalysts than cuprous salts under the same conditions.

A primary advantage with the cupric salt catalysts is to provide more reactive systems (less catalyst, shorter reaction time, etc.).

A primary advantage with the cuprous salt catalysts is to provide more useful systems (freedom from the corrosive effects of cupric salts, less sensitivity to water in the reagents, etc.).

DESCRIPTION OF THE INVENTION

The above-mentioned advantages are secured according to this invention which is, in essence:

The improvement in a process for the preparation of a high molecular weight polyphenylene ether having a degree of polymerization of at least about 50 by oxidatively coupling a monovalent phenol having substitution in at least the two ortho positions and hydrogen or halogen in the para position, using oxygen and a complex catalyst comprising a copper salt and a primary, secondary or tertiary amine as an oxidizing agent, characterized in that there is included in said complex catalyst a metal bromide, specifically, an alkali metal bromide or an alkaline earth metal bromide, including mixtures thereof, the metal bromide being present in the catalyst in an amount at least sufficient to increase the rate of oxidative coupling.

In one preferred feature, the copper salt is a cuprous salt. In another preferred feature, the copper salt is a cupric salt.

The nature of the alkali metal bromide or alkaline earth metal bromide activator is not particularly critical. However, non-metallic bromides, e.g., ammonium bromide, do not appear to be activators. Illustrative members of the activator family are lithium bromide, sodium bromide, potassium bromide, rubidium bromide, cesium bromide, magnesium bromide, calcium bromide, strontium bromide and barium bromide. Preferred activators are sodium bromide, potassium bromide, lithium bromide, cesium bromide and magnesium bromide. They can be used alone or in admixture. They can also be used in anhydrous or hydrated form.

Only a small quantity of the activator is needed to effectively provide a catalyst which enhances the rate of reaction and increase the molecular weight of the polyphenylene ethers. Good results will be obtained with as little as 0.1 mole of activator per 100 moles of phenolic precursor. In general, up to about 150 moles of activator per 100 moles of phenolic precursor can be used although it is preferred to use no more than about 30 moles of activator per 100 moles of phenol. With respect to the copper salt, while not critical, the bromide activator is preferred to be present in an amount of from about 0.5 to about 25 moles per mole of copper salt and, especially preferably, from about 1 to about 10 moles per mole of copper salt.

The activators are all readily available or can be prepared in known ways. Although it is not all essential, the activators are all conveniently included in the catalyst by stirring the copper salt and the bromide in a small amount of an alcohol, e.g., methanol, and then adding the mixture to the amine dissolved in an aliquot of the reaction solvent. This gives an intimate mixture which can be conveniently handled. The use of an alcohol is not essential however, as active catalysts can be obtained from the same copper salt and bromide without alcohol.

The improved process of this invention is broadly applicable to all of the phenols disclosed in the above-mentioned Hay patents but is preferably used with phenols of Formula I above. The most preferred phenols for purposes of the present invention are those of Formula I wherein Q and Q' are hydrocarbon radicals having from 1 to 8 carbon atoms and Q'' are each hydrogen. Illustrative of such preferred phenols are 2,6-dimethylphenol, 2,6-diethylphenol, 2-methyl-6-ethylphenol, 2-methyl-6-allylphenol, 2-methyl-6-phenylphenol, 2,6-diphenylphenol, 2,6-dibutylphenol and 2-methyl-6-propylphenol. Especially preferred as a phenolic starting material is 2,6-dimethylphenol, also known as 2,6-xylenol (Q and Q' are each methyl radicals).

The polyphenylene ethers prepared by the present process will correspond to the phenolic precursors and will include those of Formula II.

The primary, secondary or tertiary amine component of the catalyst complex corresponds to those disclosed in the above-mentioned Hay patents. Illustrative members include aliphatic amines, including aliphatic mono- and di-amines, where the aliphatic group can be straight or branched chain hydrocarbon or cycloaliphatic. Preferred are aliphatic primary, secondary and tertiary monoamines and tertiary diamines. Especially preferred are mono-, di- and tri(lower)alkyl amines, the alkyl groups having from 1 to 6 carbon atoms. Typically, there can be used mono-, di- and tri-methyl, ethyl, n-propyl, i-propyl, n-butyl substituted amines, mono- and di-cyclohexylamine, ethylmethyl amine, morpholine, N-(lower)alkyl cycloaliphatic amines, such as N-methylcyclohexylamine, N,N'-dialkylethylenediamines, the N',N'-dialkylpropanediamines, the N,N,N'-trialkylpentanediamines, and the like. In addition, cyclic tertiary amines, such as pyridine, alpha-collidine, gamma picoline, and the like, can be used. Especially useful are N,N,N',N'-tetraalkylethylenediamines, butanediamines, and the like.

Mixtures of such primary, secondary and tertiary amines may be used if desired. A preferred mono(lower)alkyl amine is n-butyl amine; a preferred di(lower)alkyl amine is di-n-butyl amine; and a preferred tri(lower)alkyl amine is triethyl amine. A preferred cyclic tertiary amine is pyridine. The concentration of primary and secondary amine in the reaction mixture may vary within wide limits, but is desirably added in low concentrations. A preferred range comprises from about 2.0 to 25.0 moles per 100 moles of monovalent phenol. In the case of a tertiary amine, the preferred range is considerably broader, and comprises from about 0.2 to about 1500 moles per 100 moles of monovalent phenol. With tertiary amines, if water is not removed from the reaction mixture, it is preferred to use from about 500 to about 1500 moles of amine per 100 moles of phenol. If water is removed from the reaction, then only 10 moles of tertiary amine, e.g., trimethyl amine or triethyl amine, per 100 moles of phenol need be used as a lower limit. Even smaller amounts of tertiary diamines, such as N,N,N',N'-tetramethylbutanediamine can be used, down to as low as 0.2 mole per 100 moles of phenol.

Typical examples of cuprous salts and cupric salts suitable for the process are shown in the Hay patents. These will include cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts are the halides, alkanoates or sulfates, e.g., cuprous bromide and cuprous chloride, cupric bromide and cupric chloride, cupric sulfate, cupric fluoride, cuprous acetate and cupric acetate. With primary and secondary amines, the concentration of the copper salts is desirably maintained low and preferably varies from about 0.2 to 2.5 moles per 100 moles of monovalent phenol. With tertiary amines, the copper salt is preferably used in an amount providing from about 0.2 to about 15 moles per 100 moles of the monovalent phenol.

The polymerization reaction is preferably performed in a solvent. Suitable solvents are disclosed in the above noted Hay patents. Aromatic solvents such as benzene, toluene, xylene and o-dichlorobenzene are especially preferred, although tetrachloromethane, trichloromethane, dichloromethane, 1,2-dichloroethane and trichloroethylene may also be used.

The process for forming the polymer and the reaction conditions, such as temperature, oxygen, flow rate and the like are essentially the same as the conditions disclosed in the above-mentioned Hay patents, though reaction time to generate high molecular weight polymer is reduced. The above noted concentration ranges are preferred, though these ranges may vary to some extent depending upon oxygen flow rate, reaction temperature and the like.

In a preferred manner of proceeding, a suitable reaction vessel is charged with the solvent, the copper salt mixed with the bromide activator and the amine. The mixture is stirred for a short time, sufficient to mix the ingredients, e.g., 5 minutes, then the activator is added.

Then the phenolic precursor is added and well mixed. Oxygen is next passed into the stirred mixture for the desired period, e.g., 120 minutes, and the reaction temperature is maintained at between 15 and 35° C., preferably at about 25° C. or 30° C., cooling if necessary. Polymerization is terminated in a known way, e.g., by adding 50% aqueous acetic acid. The product is recovered in a known way, e.g., by separating the aqueous acid layer by centrifugation and adding a non-solvent for the polymer, e.g., methanol, to the organic layer until the polyphenylene ether has been substantially completely precipitated. The polymer is reslurried in a non-solvent, e.g., methanol, and vacuum dried. The theoretical yield is calculated from the polymer weight. The degree of polymerization, i.e., relative molecular weight, is proportional to the intrinsic viscosity. This is determined in a known way, e.g., by measuring the viscosity of a dilute chloroform solution of the polymer at 30° C.

The polyphenylene ethers prepared by the process of this invention are useful for all the purposes disclosed in the above-mentioned Hay patents. For example, they can be used in molded articles or in films, tapes and the like. They may be mixed with other resins, or various fillers, reinforcements, dyes, pigments, stabilizers, plasticizers and the like.

DESCRIPTION OF THE PREFERRED EMBODIMENTS

The following examples illustrate the processes of this invention. They are merely illustrative and are not to be construed to limit the invention in any manner whatsoever.

Example 1

A mixture of 0.84 g. (0.0052 mole) of anhydrous cupric sulfate and 1.17 g. (0.0116 mole) of sodium bromide in 4 ml. of methanol is stirred for 30 minutes then poured into a solution of 10.9 g. (0.085 mole) of di-n-butyl amine in 100 ml. of toluene using 2 ml. of methanol to help transfer the residue. The mixture is stirred for 5 minutes, 4 ml. of a 50% by weight solution of 2,6-xylenol in toluene is added, and the catalyst solution is stirred for another 10 minutes.

The catalyst solution is transferred to a one-liter reactor, fitted with an oxygen inlet tube, cooling coils, and a 2″ x ¼″ turbine stirrer. Toluene, 400 ml., is added and the mixture is stirred at 1500 r.p.m., the temperature being maintained at 35° C. Oxygen is passed into the mixture at a rate of one cubic foot per hour and then 68 g. of 2,6-xylenol dissolved in 68 g. of toluene is added during 4 minutes, followed by 50 ml. of toluene. The molar ratio of 2,6-xylenol:copper salt:bromide activator: amine is 100:1:2:15. After two hours, 30 ml. of a 50% by weight solution of acetic acid in water is added to terminate polymerization. The reaction mixture is centrifuged and the organic layer, containing polymer, is separated. The poly(2,6-dimethyl-1,4-phenylene)ether is precipitated from the organic layer by the addition of an excess of methanol. The product is filtered off, washed with methanol and dried in a vacuum to a constant weight. There is obtained 62.7 g., 90% yield, of product having an intrinsic viscosity of 0.69 deciliter/gram (chloroform solvent, 30° C.).

For comparative purposes, the procedure is repeated (comparative Example 1–C), omitting the sodium bromide activator from the catalyst.

At the end of two hours, no methanol insoluble polymer can be precipitated from the solution.

The data of this Example 1 demonstrate that cupric sulfate, which is almost completely inactive at a xylenol: copper:amine mole ratio of 100:1:15, becomes very active when sodium bromide is included in the catalyst mixture, producing poly(2,6 - dimethyl - 1,4 - phenylene) ether with a degree of polymerization suitable for molding, in 2 hours at a xylenol:copper:sodium bromide: amine molar ratio of 100:1:2:15.

Examples 2–16

The procedure of Example 1 is repeated, except that the temperature is maintained at 30° C. instead of 35° C., and the 2,6-xylenol is added during 9 minutes instead of 4 minutes.

For the anhydrous cupric sulfate, there are substituted anhydrous cupric chloride, $CuCl_2$; cupric chloride dihydrate, $CuCl_2 \cdot 2H_2O$; cupric bromide, $CuBr_2$; cupric acetate monohydrate, $Cu(OAc)_2 \cdot H_2O$; cupric sulfate pentahydrate, $CuSO_4 \cdot 5H_2O$; and cupric fluoride, $CuF_2$.

For the sodium bromide, there is substituted potassium bromide; KBr; ammonium bromide, $NH_4Br$; lithium bromide, LiBr; cesium bromide, CsBr; and magnesium bromide dihydrate, $MgBr_2 \cdot 2H_2O$.

The molar ratios of 2,6-xylenol:copper salt:bromide: amine are 300:1:0–3:45.

For comparison purposes, certain of the procedures are repeated, omitting the activator.

Small samples of the reaction mixture are withdrawn at intervals of 60, 90 and 120 minutes, and, after isolation as described in Example 1, the intrinsic viscosities of the poly(2,6-dimethyl-1,4-phenylene)ethers are determined.

The results obtained are summarized in Table 1, the comparative procedures being designated C:

TABLE 1

Polymerization of 2,6-xylenol with bromide activated cupric salt-dibutyl amine (DBA) catalysts

| Example | Cu salt | Bromide | Molar ratio 2,6-Xy:Cu: Br:DBA[1] | Intrinsic viscosity at— | | |
|---|---|---|---|---|---|---|
| | | | | 60 min. | 90 min. | 120 min. |
| 2 | $CuCl_2$ | NaBr | 300:1:1:45 | .23 | .38 | .40 |
| 2-C | $CuCl_2$ | | 300:1:0:45 | .21 | .25 | .32 |
| 3 | $CuCl_2$ | NaBr | 300:1:2:45 | .38 | .53 | .61 |
| 4 | $CuCl_2$ | NaBr | 300:1:3:45 | .34 | .52 | .62 |
| 5 | $CuCl_2$ | NaBr | 300:1:3:45 | .26 | .38 | .48 |
| 6 | $CuCl_2$ | KBr | 300:1:2:45 | .21 | .41 | .49 |
| 7 | $CuCl_2 \cdot 2H_2O$ | NaBr | 300:1:2:45 | .31 | .46 | .54 |
| 7-C | $CuCl_2 \cdot 2H_2O$ | | 300:1:0:45 | | | .09 |
| 8 | $CuBr_2$ | NaBr | 300:1:2:45 | .38 | .55 | .64 |
| 8-C | $CuBr_2$ | | 300:1:0:45 | .25 | .48 | .60 |
| 9 | $Cu(OAc)_2 \cdot H_2O$ | NaBr | 300:1:2:45 | .27 | .41 | .52 |
| 9-C | $Cu(OAc)_2 \cdot H_2O$ | | 300:1:0:45 | | | 0.06 |
| 10 | $CuSO_4$ | NaBr | 300:1:2:45 | .25 | .41 | .49 |
| 10-C | $CuSO_4$ | | 300:1:0:45 | | | [2] |
| 11 | $CuSO_4 \cdot 5H_2O$ | NaBr | 300:1:2:45 | .30 | .43 | .54 |
| 11-C | $CuSO_4 \cdot 5H_2O$ | | 300:1:0:45 | | | [3] |
| 12 | $CuF_2$ | NaBr | 300:1:2:45 | ND | ND | .64 |
| 12-C | $CuF_2$ | | 300:1:0:45 | ND | ND | [3] |
| 13 | $CuCl_2$ | LiBr | 300:1:2:45 | ND | ND | .51 |
| 14 | $CuCl_2$ | CsBr | 300:1:2:45 | ND | ND | .49 |
| 15 | $CuCl_2$ | $MgBr_2 \cdot 6H_2O$ | 300:1:2:45 | ND | ND | .43 |
| 16 | $CuCl_2$ | $NH_4Br$ | 300:1:2:40 | | | 0.05 |

[1] Catalyst prepared without methanol.
[2] Trace of methanol insoluble polymer in 2 hrs.
[3] No methanol insoluble polymer in 2 hrs.

NOTE.—ND=Not determined.

The data in Table 1 demonstrate that the activity of certain copper salts as xylenol polymerization catalysts is greatly increased by the addition of metallic bromides, such as sodium, potassium, lithium, cesium and magnesium bromides, to the catalyst mixture. In addition, a non-metallic bromide, $NH_4Br$, is ineffective as an activator (Example 16). Cupric acetate, cupric sulfate and cupric fluoride which are almost completely ineffective (Examples 9–C, 10–C, 11–C and 12–C) become very active when a bromide is included (Examples 9, 10, 11 and 12). Even relatively active copper salts, such as cupric chloride (Example 2–C) become much more active when sodium or potassium bromide is added (Examples 2–6). The combination of cupric chloride and sodium bromide (Example 3) is at least as active as an equivalent amount of anhydrous cupric bromide (Example 8–C), which is the most active copper salt known for the dibutyl amine system. The beneficial effect of an activator on the cupric bromide catalyst system is also shown (Example 8).

Example 17

To a tube type reaction vessel, equipped with a stirrer, oxygen inlet tube and thermometer, are added 140 ml. of toluene, 0.73 g. (0.010 mole) of n-butyl amine, 0.134 g. (0.001 mole) of anhydrous cupric chloride and 0.206 g. (0.002 mole) of sodium bromide activator. After thorough mixing, 10.0 g. (0.82 mole) of 2,6-xylenol is added. Oxygen is passed through the stirred reaction mixture for 120 minutes, while maintaining the temperature at 25° C. The polymerization is terminated by adding 4 ml. of 50% by weight aqueous acetic acid, the acid layer is removed by centrifugation and the poly(2,6-dimethyl-1,4-phenylene)ether precipitated with an excess of methanol.

The polymer, reslurried with methanol and then vacuum dried, weighs 9.0 g. (92% yield) and has an intrinsic viscosity of 0.36 dl./g.

For comparative purposes, the procedure of this example is repeated, omitting the sodium bromide activator. Although the yield is the same, 92%, the molecular weight of the polymer is lower, intrinsic viscosity, 0.30 dl./g.

The above data demonstrate that a conventional catalyst derived from a primary aliphatic monoamine can be activated by the present invention.

Example 18

The procedure of Example 16 is repeated, substituting for the n-butyl amine, 1.13 g. (0.01 mole) of N-methylcyclohexyl amine.

The poly(2,6-dimethyl-1,4-phenylene)ether is recovered in 94% yield and has an intrinsic viscosity of 0.69 dl./g.

For comparison purposes, the procedure of this example is repeated, omitting the sodium bromide activator. Although the yield is the same, the molecular weight of the polymer is much lower, intrinsic viscosity, 0.18 dl./g.

The above data demonstrate that a catalyst derived from an N-(lower)alkyl cycloaliphatic secondary amine can be activated by the present invention.

Example 19

To a tube type reaction vessel, fitted with a stirrer, thermometer and oxygen inlet, are added 100 ml. of toluene, 10 ml. of ethanol, 30 ml. of pyridine, 1.0 g. (0.01 mole) of cuprous chloride and 2.1 g. (0.02 mole) of sodium bromide.

After thorough mixing, 5.0 g. (0.041 mole) of 2,6-xylenol is added and oxygen is passed through the reaction mixture for 3 minutes. Polymerization is terminated by pouring the reaction mixture into methanol acidified with hydrochloric acid. The precipitated poly(2,6-dimethyl-1,4-phenylene)ether is filtered, washed with methanol and vacuum dried.

The product weighs 4.7 g., 96% yield, and has an intrinsic viscosity of 0.71 dl./g.

For comparative purposes, the procedure of this example is repeated, omitting the sodium bromide activator. Although the yield is the same, 96%, the molecular weight of the polymer is lower, intrinsic viscosity, 0.44 dl./g.

The above data demonstrate that a catalyst derived from tertiary heterocyclic aromatic amine can be activated by the present invention.

Examples 20–28

The procedure of Example 1 is repeated, except that the temperature is maintained at 30° C. instead of 35° C., and the 2,6-xylenol is added during 9 minutes instead of 4 minutes.

For anhydrous cupric sulfate, there are substituted cuprous chloride, CuCl; and cuprous bromide, CuBr.

In two instances, a promotor, diphenyl guanidine (DPG) is added.

The molar ratios of 2,6-xylenol:copper salt:sodium bromide:di-n-butyl amine:diphenyl guanidine are 300:1–2:0–10:20–45:0–3.

Small samples of the reaction mixtures are withdrawn at intervals of 90 and 120 minutes, and, after isolation as described in Example 1, the intrinsic viscosities of the poly(2,6-dimethyl-1,4-phenylene)ethers are determined.

The results obtained are summarized in Table 2, the comparative procedures (in which the bromide activator is omitted) being designated C.

TABLE 2

Polymerization of 2,6-xylenol with sodium bromide activator-cuprous salt-dibutyl amine (DBA) catalysts

| | Cu salt | Molar ratio 2,6-Xy: Cu:NaBr: DBA:DPG [1] | Intrinsic viscosity 90 min. | 120 min. |
|---|---|---|---|---|
| Example: | | | | |
| 20 | CuCl | 300:1:1:45:0 | .29 | .38 |
| 20–C | CuCl | 300:1:0:45:0 | | .15 |
| 21 | CuCl | 300:1:2:45:0 | .30 | .47 |
| 22 | CuCl | 300:1:10:45:0 | | .45 |
| 23 | CuBr | 300:1:1:45:0 | .38 | .50 |
| 23–C | CuBr | 300:1:0:45:0 | .30 | .39 |
| 24 | CuCl | 300:2:2:45:0 | | .50 |
| 25 | CuCl [2] | 300:2:2:45:0 | | .50 |
| 26 | CuCl | 300:2:2:20:0 | .16 | .34 |
| 27 | CuCl | 300:2:2:20:0.5 | .38 | .46 |
| 28 | CuCl | 300:2:2:20:3 | .37 | .50 |

[1] DBA=di-n-butylamine; DPG=diphenylguanidine.
[2] No methanol used in preparation of catalyst.

The above data demonstrate that the combination of sodium bromide and cuprous chloride is about equal in activity to cuprous bromide. The activity is further increased by increasing the ratio of sodium bromide to cuprous chloride.

Although the 1:1 cuprous chloride-sodium bromide combination (Example 20) is somewhat less active than the cupric salt-sodium bromide catalysts (Examples 2–5), it is sufficiently active to yield polymer with intrinsic viscosity of about 0.50 dl./g. in two hours at a molar ratio of 300:2:2:45:0 (Example 24). In comparison with prior art cupric salt catalysts, this catalyst is less sensitive to the presence of water in the reagents and almost as active without methanol as with methanol. The rate of the polymerization reaction may be increased by addition of diphenyl guanidine (Examples 27 and 28), which is known to be a promotor.

Although the above examples have shown various modifications of the present invention, other variations are possible in light of the above teachings. It is therefore to be understood that changes may be made in the particular embodiments of the invention described which are within the full intended scope of the invention as defined by the appended claims.

We claim:
1. In a process for the preparation of a high molecular weight polyphenylene ether having a degree of polymerization of at least 50 by oxidatively coupling a monovalent phenol having substitution in at least the two ortho positions and hydrogen or halogen in the para position, using oxygen and a complex catalyst comprising a copper salt and a primary, secondary or tertiary amine as an oxidizing agent, the improvement which comprises including in said complex catalyst an alkali metal bromide or an alkaline earth metal bromide, said bromide being present in an amount at least sufficient to increase the rate of oxidative coupling.

2. In a process for the preparation of a high molecular weight polyphenylene ether having a degree of polymerization of at least 50 by oxidatively coupling a monovalent phenol having substitution in at least the two ortho positions and hydrogen or halogen in the para position, using oxygen and a complex catalyst comprising a cuprous salt and a primary, secondary or tertiary amine as an oxidizing agent, the improvement which comprises including in said complex catalyst an alkali metal bromide or an alkaline earth metal bromide, said bromide being present in an amount at least sufficient to increase the rate of oxidative coupling.

3. A process as defined in claim 2 wherein said bromide is sodium bromide.

4. A process as defined in claim 2 wherein said bromide is potassium bromide.

5. A process as defined in claim 2 wherein said bromide is lithium bromide.

6. A process as defined in claim 2 wherein said bromide is cesium bromide.

7. A process as defined in claim 2 wherein said bromide is magnesium bromide.

8. A process as defined in claim 2 wherein said bromide is present in an amount of from about 0.5 mole to about 25 moles per mole of said cuprous salt.

9. In a process for the preparation of a high molecular weight polyphenylene ether having a degree of polymerization of at least 50 by oxidatively coupling a monovalent phenol having substitution in at least the two ortho positions and hydrogen or halogen in the para position, using oxygen and a complex catalyst comprising a cupric salt and a primary, secondary or tertiary amine as an oxidizing agent, the improvement which comprises including in said complex catalyst an alkali metal bromide or an alkaline earth metal bromide, said bromide being present in an amount sufficient to increase the rate of oxidative coupling.

10. A process as defined in claim 9 wherein said bromide is sodium bromide.

11. A process as defined in claim 9 wherein said bromide is potassium bromide.

12. A process as defined in claim 9 wherein said bromide is lithium bromide.

13. A process as defined in claim 9 wherein said bromide is cesium bromide.

14. A process as defined in claim 9 wherein said bromide is magnesium bromide.

15. A process as defined in claim 9 wherein said bromide is present in an amount of from about 0.5 mole to about 25 moles per mole of cupric salt.

References Cited
UNITED STATES PATENTS

| | | | |
|---|---|---|---|
| 3,337,499 | 8/1967 | Bussink et al. | 260—75 |
| 3,365,422 | 1/1968 | Van Dort | 260—75 |
| 3,549,670 | 12/1970 | Spousta | 260—75 |

MELVIN GOLDSTEIN, Primary Examiner